United States Patent [19]

Lehmann

[11] 3,858,090

[45] Dec. 31, 1974

[54] OIL-COOLED ELECTRICAL APPARATUS WITHDRAWABLE FROM AN OUTER CASING FOR INSPECTION AND REPAIRS

[75] Inventor: Kjeld Lehmann, Sonderborg, Denmark

[73] Assignee: Danfoss A/S, Nordborg, Denmark

[22] Filed: Nov. 12, 1973

[21] Appl. No.: 415,118

[30] Foreign Application Priority Data

Nov. 14, 1972 Germany............................ 2255646

[52] U.S. Cl.................. 317/100, 174/15 R, 165/105

[51] Int. Cl.............................................. H05k 7/20

[58] Field of Search....... 317/100, 101 D; 174/15 R, 174/16 R, DIG. 5; 321/8 C; 165/105, 106

[56] References Cited

UNITED STATES PATENTS

| | | | |
|---|---|---|---|
| 3,091,722 | 5/1963 | Borowiec | 317/100 |
| 3,184,645 | 5/1965 | Schaeffer | 317/101 D |
| 3,270,250 | 8/1966 | Davis | 317/100 |
| 3,600,636 | 8/1971 | Petersen | 317/100 |
| 3,662,225 | 5/1972 | Carter | 317/101 D |
| 3,792,338 | 2/1974 | Barthelemy | 317/100 |

*Primary Examiner*—Robert K. Schaefer
*Assistant Examiner*—Gerald P. Tolin

[57] ABSTRACT

The invention relates to electrical apparatus of substantial size which includes an outer container and a unit insertable in the container which can be readily withdrawn for the purposes of repair or inspection. The insertable unit consists of an oil cooled lower part and an upper control part. The container has an internal shoulder which is engaged by the upper control part of the unit when the unit is inserted in the container. Struts are provided to serve as a support for the unit when it is withdrawn from the container. The oil cooled lower part includes two vertically extending plates disposed in parallel relation to each other and in spaced relation to the inner walls and floor of the casing. The plates have electrical components mounted on their mutually facing sides and the casing is filled with oil to completely immerse the lower part.

2 Claims, 2 Drawing Figures

Figure 1:
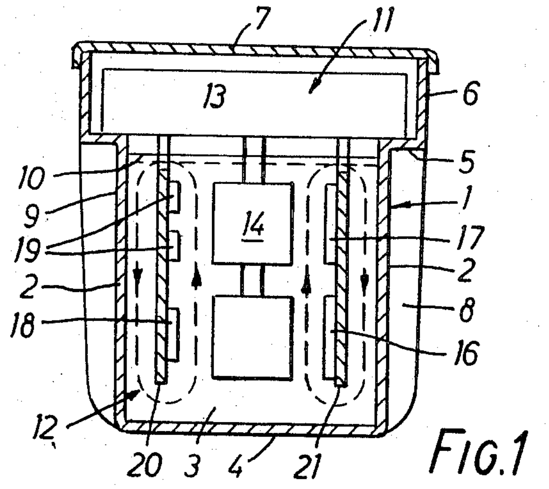

OIL-COOLED ELECTRICAL APPARATUS WITHDRAWABLE FROM AN OUTER CASING FOR INSPECTION AND REPAIRS

The invention concerns an oil-cooled electrical apparatus in which a large number of electrical components are arranged in a casing filled with oil.

There arise many cases in which a large number of electrical components have to be cooled. This applies in particular to the power part of a controlled inverter as known for use in regulating the speed of alternating current motors.

In this case it is also known to cool the power part with oil and to provide the casing with cooling fins in order to increase the cooling effect.

The object of the present invention is to provide an oil-cooled electrical apparatus of the initially described kind in which improved cooling of the components is achieved.

According to the invention this object is achieved by providing a number of components on two plates which are disposed substantially parallel to and at a distance from oppositely disposed side-walls of the casing, and which terminate at a distance from the base of the casing and from the surface of the oil, and by arranging further components in the space between these plates.

The plates are used primarily as supports for various components. They also induce thermal flow of the cooling oil which passes downwardly between each plate and its associated side-wall and upwards between the plates. This ensures that the components arranged between the plates and in particular the components fitted on the plates are disposed in a forced-flow stream which results in very effective dissipation of heat.

In particular, smaller components, such as rectifiers and resistors, can be arranged on the plates, and larger components, such as chokes and transformers, between the plates. This leads to a readily inspected compact arrangement subjected to an intensive cooling action.

It is recommended that the plates carry the components mainly only on the side of each plate remote from the associated side-wall of the casing. The oil flowing between each plate and side-wall of the casing is therefore subjected only to the cooling effect of the side-wall but not to the heating effect of the components. Consequently a considerable drop in temperature results which enables the oil in the space between the two plates to absorb considerable quantities of heat.

The surfaces of the long sides of the components mounted on the plates preferably extend in the vertical direction. Rectifiers mounted on the plates would have vertical cooling ribs. Since, in this arrangement, only slight resistance is offered to the forced flow, a relatively high rate of circulation of the oil is achieved, and this increases the cooling effect.

In accordance with a further feature of the invention, the plates carry printed circuits. The components mounted on these plates can therefore be directly interconnected by way of these printed conducting paths.

Particular advantages are achieved if each of the plates is hinged by one of its side edges on a frame. The plates can then be swung out like doors. This arrangement renders the components mounted on their inner faces as well as the components arranged between the plates readily accessible for the purpose of repair and inspection.

In a preferred embodiment, the frame is adapted to be removed from the casing and can be held on the casing at such a level that the lower edge of each of the plates is disposed above the upper edge of the casing. In this way all the components of the power part become accessible without the frame having to be completely removed from the casing and to be placed on a separate supporting surface. This facilitates on site repair and inspection.

Figure 2:
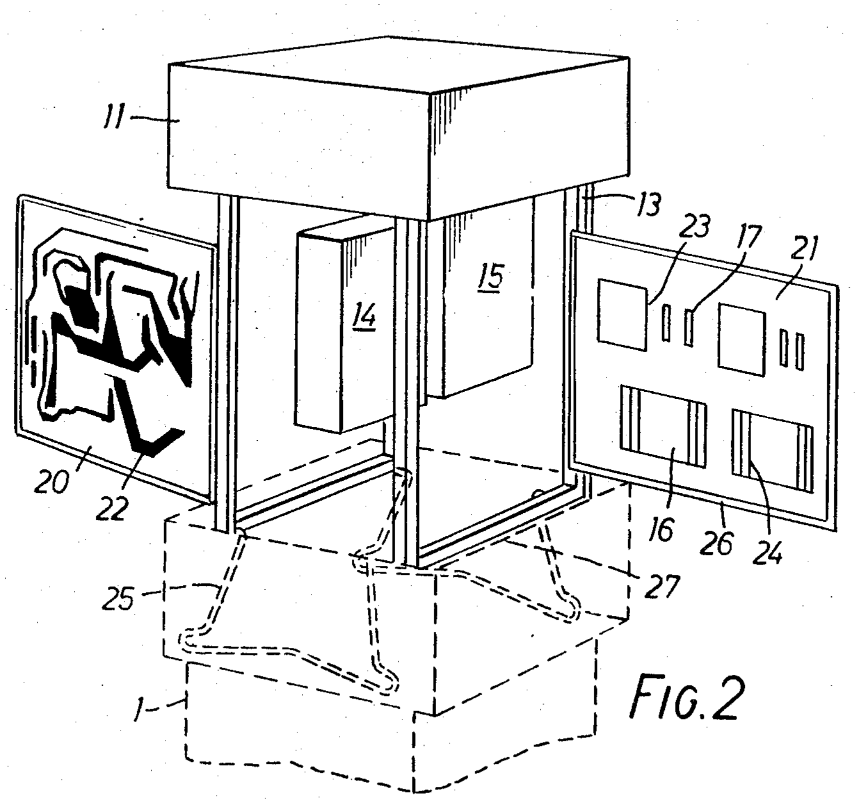

The invention will now be described in greater detail by reference to a form of construction illustrated diagrammatically in the drawing, in which:

FIG. 1 shows a longitudinal section through an oil-cooled electrical apparatus in accordance with the invention, and FIG. 2 is a perspective illustration of the apparatus in its inspection position.

A casing 1 has side-walls 2 and 3 and a base 4. A shoulder 5 leads to an upper wall portion 6. A cover 7 closes off the interior. The side-walls 2 and 3 are provided with cooling ribs 8. The casing is filled with oil 9. The oil-level 10 is below the shoulder 5.

Inside the casing is a control apparatus having a control part 11 and a power part 12 immersed in the oil. The entire control apparatus rests on the shoulder 5 by the frame of its control part 11. This frame also carries the components of the power part by means of a subframe 13, the disposition of which is shown only approximately in FIG. 1. These components include a choke 14 and a transformer 15, which are disposed in the middle of the casing 1, and rectifiers 16, resistors 17, condensers 18 and other components 19, which are mounted on the mutually facing inner surfaces of plates 20 and 21.

These plates are each disposed at a distance from a side wall 2. They terminate at a distance above the base 4 and below the level 10 of the oil. Consequently, when the components 14 – 19 heat up during use, there is set up a flow path, shown in broken lines, along which the oil passes upwardly between the plates 20 and 21 and downwardly over the outer faces of these plates.

Instead of two plates 20 and 21, four plates may be provided, each of these being associated with a side-wall 2 or 3.

As shown in FIG. 2, the plates 20 and 21 have printed conducting paths 22 on their rear faces. The components mounted on the inner face of each plate are arranged with the surface 23 of their long sides in the vertical position. The rectifiers 16 have vertically extending cooling ribs 24.

The plates 20 and 21 are hinged by one of their side edges to the frame 13 in the manner of doors. They can therefore be swung out so that the components disposed in the middle of the apparatus and those mounted on the inner faces of the plates become readily accessible.

Fitted at the bottom of the frame 13 are stays 25 which can be swung outwardly and supported on the shoulder 5 when the entire control apparatus is lifted out of the casing. The lower edge 26 of each of the plates 20 and 21 is then positioned above the upper edge 27 of the casing. Since the plates 20 and 21 can then be swung out, the control apparatus can be inspected and repaired on site.

I claim:

1. Electrical apparatus comprising an upwardly open casing, an assembly insertable into and withdrawable from said casing, said assembly including an oil cooled lower unit and an upper control unit, means for suspendingly supporting said assembly in said casing, said lower unit including two vertically extending plates disposed in parallel relation to each other and in spaced relation to the inner walls and floor of said casing, said plates having electrical components mounted on their mutually facing sides, said casing being filled with oil to completely immerse said lower unit, said upper control unit having frame means suspended therefrom, said plates being hingedly mounted on said frame means for pivotal movement about a vertical axis.

2. Electrical apparatus according to claim 1 wherein said assembly the upper portion of said casing has shoulder means, a pair of stay members pivotally attached to the lower end of said frame means, said stay member being inwardly nested when said assembly is in its inserted position and engageable with said shoulder means to support when said assembly is in a withdrawn position.

* * * * *